United States Patent
Becker (10) Patent No.: US 11,423,442 B2
(45) Date of Patent: *Aug. 23, 2022

(54) METHOD AND SYSTEM FOR PREDICTING RELEVANT OFFERINGS FOR USERS OF DATA MANAGEMENT SYSTEMS USING MACHINE LEARNING PROCESSES

(71) Applicant: Intuit Inc., Mountain View, CA (US)

(72) Inventor: Eric Becker, Encinitas, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,874

(22) Filed: Jan. 29, 2021

(65) Prior Publication Data

US 2021/0182906 A1 Jun. 17, 2021

Related U.S. Application Data

(63) Continuation of application No. 16/425,163, filed on May 29, 2019, now Pat. No. 10,984,446.

(51) Int. Cl.
*G06Q 30/02* (2012.01)
*G06N 20/00* (2019.01)

(52) U.S. Cl.
CPC ......... *G06Q 30/0255* (2013.01); *G06N 20/00* (2019.01); *G06Q 30/0201* (2013.01); *G06Q 30/0202* (2013.01)

(58) Field of Classification Search
CPC ........... G06Q 30/0255; G06Q 30/0201; G06Q 30/0202; G06N 20/00; G06N 3/08
See application file for complete search history.

(56) References Cited

U.S. PATENT DOCUMENTS

| | | |
|---|---|---|
| 8,402,543 B1 | 3/2013 | Ranjan et al. |
| 2007/0027751 A1* | 2/2007 | Carson .................... G06F 40/30 705/14.46 |
| 2016/0042401 A1* | 2/2016 | Menendez ............. B60L 53/63 705/14.43 |
| 2017/0061502 A1* | 3/2017 | Zhang ................ G06Q 30/0275 |
| 2020/0184344 A1* | 6/2020 | Dobrovolsky ......... G06Q 40/06 |
| 2021/0142000 A1* | 5/2021 | Vis .................... G06F 16/24578 |

OTHER PUBLICATIONS

Bamshad et al. Effective personalization based on association rule discovery from web usage data. Proceedings of the 3rd international workshop on Web information and data management. Nov. 2001. pp. 9-15. (Year: 2001).*

Mobasher et al. WIDM '01: Proceedings of the 3rd international workshop on Web information and data management. Nov. 2001, pp. 9-15. (Year: 2001).*

Bamshad et al., "Effective Personalization Based on Association Rule Discovery from Web Usage Data," Proceedings of the 3rd International Workshop on Web Information and Data Management, Nov. 2001, pp. 9-15.

* cited by examiner

*Primary Examiner* — Michael W Schmucker
*Assistant Examiner* — Christopher C Busch
(74) *Attorney, Agent, or Firm* — Paradice and Li LLP (57) ABSTRACT

A method and system provides a data management system that provides data management services and products to users. The method and system provides a predictive model that generates probability scores indicating the likelihood that current users of the data management system would select promotional messages if the promotional messages are presented to the current users.

18 Claims, 5 Drawing Sheets

| | PROMOTIONAL MESSSAGE 1 | PROMOTIONAL MESSSAGE 2 | PROMOTIONAL MESSSAGE 3 | PROMOTIONAL MESSSAGE 4 | PROMOTIONAL MESSSAGE 5 | ... | PROMOTIONAL MESSAGE M-1 | PROMOTIONAL MESSSAGE M |
|---|---|---|---|---|---|---|---|---|
| USER 1 | 0.01 | 0.32 | 0.07 | 0.11 | 0.4 | ... | 0.13 | 0.02 |
| USER 2 | 0.20 | 0.14 | 0.17 | 0.13 | 0.16 | ... | 0.17 | 0.11 |
| USER 3 | 0.07 | 0.37 | 0.42 | 0.35 | 0.22 | ... | 0.01 | 0.01 |
| ⋮ | ⋮ | ⋮ | ⋮ | ⋮ | ⋮ | | ⋮ | ⋮ |
| USER K-1 | 0.05 | 0.60 | 0.05 | 0.10 | 0.13 | ... | 0.22 | 0.13 |
| USER K | 0.03 | 0.04 | 0.07 | 0.25 | 0.08 | ... | 0.09 | 0.10 |

METHOD AND SYSTEM FOR PREDICTING RELEVANT OFFERINGS FOR USERS OF DATA MANAGEMENT SYSTEMS USING MACHINE LEARNING PROCESSES

CROSS-REFERENCE TO RELATED APPLICATION

This Patent Application is a continuation of and claims priority to U.S. patent application Ser. No. 16/425,163 entitled "METHOD AND SYSTEM FOR PREDICTING RELEVANT OFFERINGS FOR USERS OF DATA MANAGEMENT SYSTEMS USING MACHINE LEARNING PROCESSES" filed on May 29, 2019, now U.S. Pat. No. 10,984,446, which is assigned to the assignee hereof. The disclosures of all prior Applications are considered part of and are incorporated by reference in this Patent Application in their respective.

BACKGROUND

Millions of people turn to electronic data management systems for assistance in managing various kinds of data. Electronic data management systems represent a potentially efficient and convenient way to manage data of many kinds. For example, millions of people turn to data management systems for assistance with tax return preparation, bookkeeping, accounting, and transaction monitoring. Users typically navigate through the various pages of the data management system and receive data management services from the data management system.

Some traditional data management systems have sought to provide promotional messages to users as the users navigate through the data management systems. The promotional messages can include commercial offerings for products or services provided by the data management systems or by third parties. These promotional offerings can potentially be very advantageous to the users of the data management systems, to the data management systems themselves, and to third parties. Users can be exposed to products or services that they might find helpful. Data management systems can generate increased exposure for their products and services, data management systems can receive advertising revenue from third parties, and third parties can generate increased exposure for their products and services.

In spite of the potential advantages in providing promotional messages, traditional data management systems fail to fully realize their full potential benefits. For example, many traditional data management systems provide the same promotional messages to each user or provide the same promotional messages on a given data management page for all users. While this is an improvement over traditional data management systems that provide no promotional messaging at all, the static, inflexible, and unintelligent promotional messaging represents a gross underutilization of the opportunity to inform millions of users about valuable products and services provided by the data management systems or third parties.

One reason that traditional data management systems provide static promotional messaging is because traditional data management systems are not able to overcome the technical difficulties in accurately providing more useful and dynamic promotional messaging without simultaneously expending tremendous amounts of processing, memory, and communication bandwidth resources. Therefore, when users access the data management services, traditional data management systems are unable to efficiently provide effective personalized promotional messaging.

Accordingly, there exists a technical problem of accurately and efficiently providing dynamic personalized messaging to users of data management systems. What is needed is a system and method that can provide a technical solution to the technical problem of inefficient and inadequate promotional messaging in data management systems.

SUMMARY

Embodiments of the present disclosure provide one or more technical solutions to the technical problem of inefficient and inadequate promotional messaging in data management systems. Embodiments of the present disclosure provide a data management system that includes a messaging content database having a large number of promotional messages promoting various products and services. Embodiments of the present disclosure retain clickthrough data indicating how users of the data management system have previously selected promotional messages that have been presented to them. Embodiments of the present disclosure train a predictive model with machine learning processes to predict, for each user, which promotional messages the user is most likely to select based on the characteristics of the user and the characteristics of the promotional messages. The disclosed embodiment present, to each user, promotional messages that are most likely to be selected by the user based on the analysis performed by the predictive model.

Embodiments of the present disclosure address some of the shortcomings associated with traditional data management systems that do not provide personalized promotional messaging content to users of the data management systems, or that provide ineffective messaging content to users. A data management system in accordance with one or more embodiments provides dynamically personalized promotional messaging content to users of the data management system by utilizing machine learning processes to train a predictive model to quickly, efficiently, and accurately determine which promotional messages are most likely to be selected by the users. The data management system provides promotional messages based on the characteristics of the users and the characteristics of the promotional messages.

BRIEF DESCRIPTION OF THE DRAWINGS

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Figure 1:
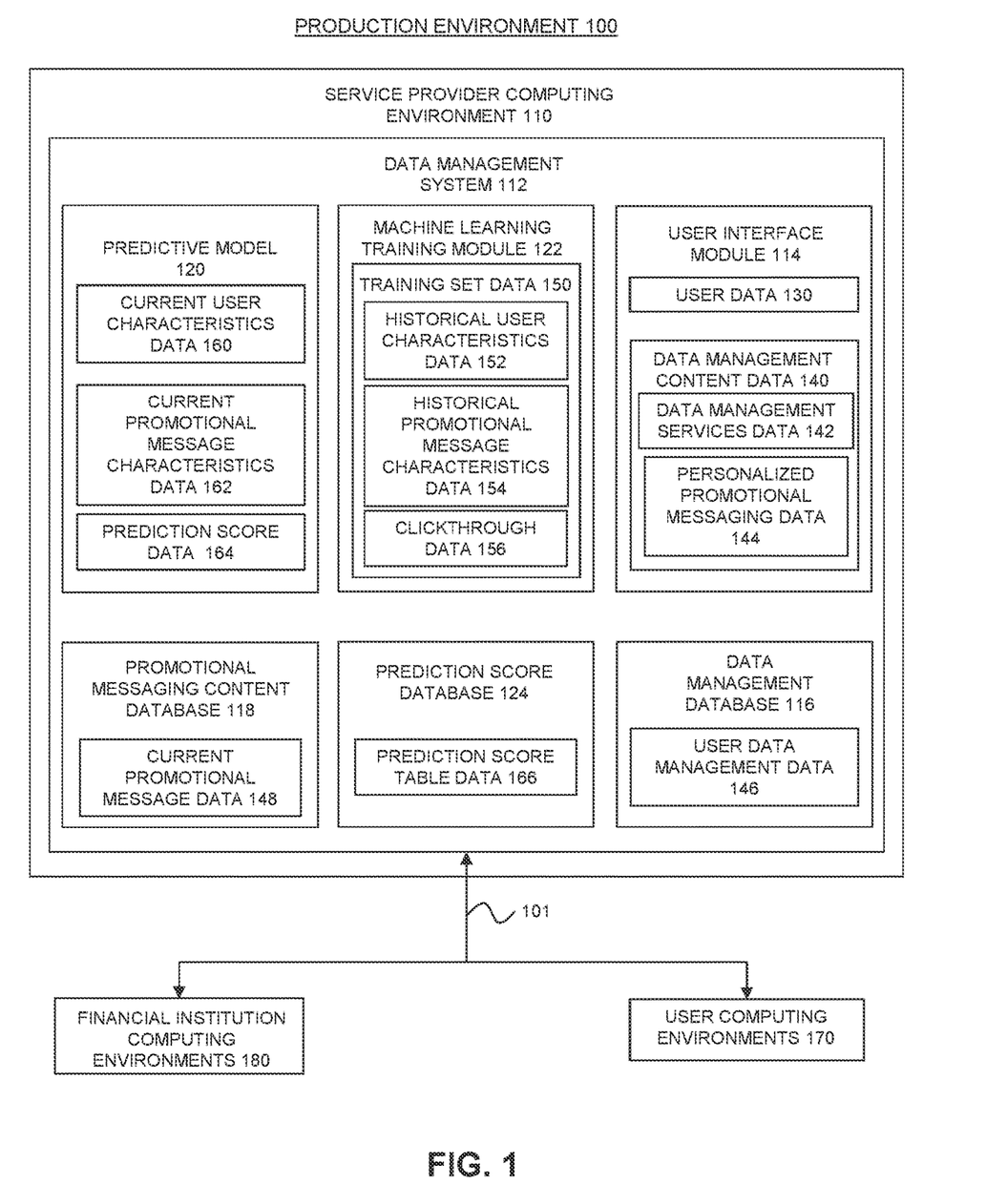
FIG. 1 is a block diagram of a system for providing personalized promotional messaging to users of a data management system, in accordance with one embodiment.

FIG. 1 illustrates a block diagram of a production environment 100 for providing personalized promotional messaging to users of a data management system. Embodiments of the present disclosure provide a data management system that provides data management services to users. The data management system provides promotional messages to users while the users utilize the data management system. The data management system trains a predictive model with a machine learning process to identify, for each user, which promotional messages are most likely to be clicked or otherwise selected by the user. The data management system trains the predictive model based on the characteristics of historical users that have been exposed to the promotional offerings, the characteristics of the promotional offerings, and the rate at which the historical users selected the promotional offerings. After the predictive model has been trained, the predictive model analyzes each current user of the data management system to determine which promotional messages are most likely to be selected by the current user. The data management system then presents, to each user, personalized messaging content data including the promotional messages that are most likely to be selected by that user.

The predictive model is able to make effective predictions for new users and for new promotional messages. Because the machine learning process trains the predictive model based on the characteristics of the historical users and the characteristics of the promotional messages, the predictive model is able to make effective predictions for new users and new promotional messages based on the characteristics of the new users and the characteristics of the new promotional messages.

The data management system uses the predictive model to generate prediction scores for each current user and each promotional message from a database of promotional messages. For a given user, the data management system generates a respective prediction score for each promotional message. The data management system can generate a table, or tables, that include prediction scores for every user and promotional message pairing.

The data management system periodically updates the table or tables of prediction scores by analyzing each user and promotional message pair with the predictive model. For example, the data management system can process the current user data and promotional message data with the predictive model each night when system resources are most available. Then, when users access the data management system, the data management system can reference the table or tables to determine which promotional messages should be provided to the users. The data management system can process the current user data and promotional message data daily, weekly, monthly, or in accordance with another selected periodicity. The data management system can select a promotional message with a highest prediction score. When a current user logs into the data management system, the selected promotional message is automatically presented to the current user. This alleviates the need for the data management system to make real time decisions and analysis regarding what promotional message should be presented to the user because the selection has already been made.

The disclosed method and system for providing personalized promotional messaging to users of a data management system provides for significant improvements to the technical fields of data processing, data messaging, data management, and user experience.

In addition, as discussed above, the disclosed method and system for providing personalized promotional messaging to users of a data management system provides for the processing and storing of smaller amounts of data, i.e., to more efficiently analyze data and provide effective messaging to users; thereby eliminating unnecessary data analysis and storage. Consequently, using the disclosed method and system for providing personalized promotional messaging to users of a data management system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing personalized promotional messaging to users of a data management system.

The production environment 100 includes a service provider computing environment 110, user computing environments 170, and financial institution computing environments 180 for providing personalized promotional messaging to users of a data management system. The computing environments 110, 170, and 180 are communicatively coupled to each other with one or more communication channels 101.

The service provider computing environment 110 represents one or more computing systems such as a server or a distribution center that is configured to receive, execute, and host one or more data management systems (e.g., applications) for access by one or more users, for providing real-time personalized promotional messaging data to users that access a self-help service of the data management system. The service provider computing environment 110 can represents a traditional data center computing environment, a virtual asset computing environment (e.g., a cloud computing environment), or a hybrid between a traditional data center computing environment and a virtual asset computing environment.

The service provider computing environment 110 includes a data management system 112, which is configured to provide data management services to users. The service provider computing environment 110 includes one or more processors configured to execute software instructions stored on one or more computer readable media to provide the functionality of the data management system 112.

The data management system 112 can be a standalone system that provides data management services to a user. Alternatively, the data management system 112 is integrated into other software or service products provided by a service provider.

The data management system 112 includes, but is not limited to, one or more of a personal financial transaction monitoring system, a bookkeeping system, a tax return preparation system, or a budgeting management system. The data management system 112 presents a data management interview to users by providing interview content data to the users. The interview content data guides a user through a series of data management topics, asks questions, and invites the user to provide data related to various topics and questions.

The data management system 112 presents personalized promotional messaging data to current users of the data management system during a data management interview. The personalized promotional messaging data includes personalized messaging content selected based on the characteristics of the users and the characteristics of the promotional messages. The personalized promotional messaging data can include promotional messages for products and services provided by the data management system or by a third-party.

As a specific example, in one embodiment, the data management system 112 includes a user interface module 114, a data management database 116, a promotional messaging content database 118, a predictive model 120, a machine learning training module 122, and a prediction score database 124.

The user computing environments 170 correspond to computing environments of the various users of the data management system 112. The users of the data management system 112 utilize the user computing environments 170 to interact with the data management system 112. The users of the data management system 112 can use the user computing environments 170 to provide data to the data management system 112 and to receive data, including data management services, from the data management system 112.

The description of FIG. 1 below will include several examples in which the data management system 112 is a financial management system. Nevertheless, the principles of the present disclosure extend to data management systems other than financial management systems.

The data management system 112 can provide financial management services to individuals, businesses, organizations, government entities, groups of individuals, or any other entities for which financial management services would be beneficial. Individuals may utilize the data management system 112 to track their own revenues and expenditures. Businesses of all kinds, including large corporations, midsize companies, small businesses, or even sole proprietor businesses, can utilize the data management system 112 to track and sort their financial transactions as a way to better manage their finances. Likewise, government organizations may use the data management system 112 to track various types of expenditures and revenues. Organizations other than businesses and government entities, such as nonprofit organizations, may also utilize the data management system 112 for the purpose of monitoring and sorting expenditures and revenues. Thus, the term "user" can refer to many types of entities.

Returning to the data management system 112, the user interface module 114 is configured to receive user data 130 from the users. The user data 130 includes information, such as, but not limited to, a name of the user, an address of the user, demographics data related to the user, financial data related to the user, authentication data that enables the user to access the data management system, or any other types of data that a user may provide in working with the data management system 112.

The user data 130 can include account data corresponding to financial institution authentication data that enables the data management system 112 to access the financial accounts that the user has with third-party financial institutions or other third-parties. The financial institution authentication data provided by the users as part of the user data 130 enables the data management system 112 to acquire information related to financial transactions of the users. The financial institution authentication data can include data that allows the data management system 112 to gain access to credit card data, bank account data, retirement fund data, payroll data, income data, loan data, interest accrual data, student loan data, property ownership data, tax data, budgeting data, rent data, investments data, employment data, or other types of data regarding financial transactions or financial accounts of the users. Thus, the financial institution authentication data can include login credentials and personal identification data for various websites of third-party financial institutions. The financial institution authentication data can include usernames, passwords, bank account numbers, routing numbers, credit card numbers, answers to security questions, identification numbers, government identification numbers, birth dates, addresses, or other types of verification credentials that allow the data management system 112 to gain access to online services of third-party financial service institutions.

The user interface module 114 provides data management content data 140 to assist the user in managing the user's data. The data management content data 140 can include navigation menus and other graphical user interface (GUI) tools that enable the user to navigate the data management system 112 in order to receive data management services. The data management content data 140 can include data management services data 142 related to the financial transactions of the user. Thus, the user interface module 114 enables the data management system 112 to provide data management services to the user.

The data management system 112 includes a data management database 116. The data management database 116 includes user data management data 146. The user data management data 146 can include financial management data for all of the users of the data management system. Thus, the data management database 116 can include a vast amount of data related to the financial management services provided to users. When the user utilizes the user interface module 114 to view data management content data 140, the data management content data 140 includes user data management data 146 related to the user as retrieved from the data management database 116.

The user data management data 146 includes data related to the financial transactions of the users. The user data management data 146 can include, for each user, a list of financial transactions, summaries of various financial accounts, and other tools to assist the user in managing the user's finances.

Each financial transaction in the user data management data 146 includes merchant identification data that identifies the merchant or vendor involved in the financial transactions. It can be particularly useful for the user to track financial transactions based on which merchants, vendors, or other types of counterparties were party to the financial transactions. This can help the user to more effectively manage the user's finances. Additionally, this can help the user to detect fraud or errors if the user notices, in the financial transactions of the user, unknown merchants with whom the user has not had any financial transactions.

The data management system 112 utilizes a data acquisition module (not shown) to retrieve financial transaction data related to the financial transactions of the users of the data management system 112. The data acquisition module is configured to use the financial institution authentication data provided with the user data 130 to acquire financial transaction data related to financial transactions of the users. In particular, the data acquisition module uses the financial institution authentication data received with the user data 130 to log into the online services of third-party financial institutions in order to retrieve financial transaction data related to the financial transactions of users of the data management system 112. For example, the financial transaction data can include debit card transactions, credit card transactions, credit card balances, bank account deposits, bank account withdrawals, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, financial goal information, or any other types of financial transactions. The data acquisition module is configured to gather the financial transaction data from financial institution computing environments 180 related to financial service institutions with which one or more users of the data management system 112 have a relationship. The financial transaction data can include, for each financial transaction, time stamp data corresponding to a time stamp that indicates the date and time of the financial transaction.

In one example, the data acquisition module uses the financial institution authentication data received with the user data 130 to acquire data related to withdrawals, deposits, and balances in the bank accounts of users. The financial transaction data includes data related to these withdrawals, deposits, and balances. Accordingly, the financial institution authentication data can include usernames, passwords, bank account numbers, routing numbers, or other validation credentials needed to access online services of various banking institutions.

Many traditional data management systems do not provide promotional messages for products and services of the traditional data management systems or of third parties. In this way, many traditional data management systems miss an opportunity to leverage the traditional data management systems in order to notify users or potential users of the traditional data management systems of other available products or services.

Other traditional data management systems may present a single static promotional message while users utilize the traditional data management systems. In these traditional data management systems, the single static advertisement is the same for all users and for all assistance documents. Because the single static advertisement is the same for all users in all topics, the traditional data management systems fail to recruit users or potential users that would otherwise purchase products or services provided by the traditional data management systems.

The data management system 112 includes a promotional messaging content database 118. The promotional messaging content database 118 includes current promotional message data 148 related to a large number of promotional messages currently available to be provided to users with the data management content data 140 as the users navigate the data management system 112.

The current promotional message data 148 includes a large number of promotional messages related to various services and products offered by the data management system 112 or by third parties associated with the data management system 112. Rather than including a single static promotional message to users of the data management system 112, the current promotional message data 148 includes a large variety of promotional messages that can be served to users with the data management content data 140. Thus, the messages included in the current promotional message data 148 are directed to various products and services that may appeal to a variety of users.

The current promotional message data 148 includes advertisements for various products and services, or aspects of products and services provided by the data management system 112. Each advertisement promotes a product or service, or an aspect of a product or service provided by the data management system 112 or via a third-party associated with the data management system 112. As will be set forth in more detail below, the data management system 112 selects advertisements in a personalized manner for each user that accesses the data management system 112.

The data management system 112 utilizes the predictive model 120 to select messages from the promotional messaging content database 118 to be provided with the data management content data 140. In particular, as will be set forth in more detail below, the predictive model 120 analyzes characteristics associated with the user and characteristics associated with the promotional messages in order to identify a promotional message from the current promotional message data 148 that the user is most likely to select or click based on the analysis of the predictive model 120.

The data management system 112 utilizes the machine learning training module 122 to train the predictive model 120 to predict which promotional messages a user is most likely to select if presented to the user. The machine learning training module 122 trains the predictive model 120 with one or more machine learning processes to identify promotional messages that are likely to be selected by an individual user. In this way, the machine learning training module 122 helps generate a predictive model 120 that can more effectively provide promotional messaging to users of the data management system 112.

The machine learning training module 122 trains the predictive model 120 with a supervised machine learning process. In particular, the machine learning training module 122 utilizes training set data 150 to train the predictive model 120 to predict the probability that a given user would click on a given promotional message if the promotional message was presented to the user.

The training set data 150 includes historical user characteristics data 152. The historical user characteristics data 152 includes data related to the characteristics of a large number of historical users of the data management system 112. The historical users correspond to individuals that have used the data management system 112 in the past. The historical users correspond to individuals to whom promotional messages from the current promotional message data 148 have previously been presented. While the historical users include individuals who have utilized the data management system 112 in the past, those historical users may also currently use the services of the data management system 112.

The historical user characteristics data 152 includes various types of data that the data management system 112 retains related to the users of the data management system 112. The historical user characteristics data 152 can include the types of data included in the user data 130. The historical user characteristics data 152 can include, for each historical user, data related to an age of the historical user, data related to a marital status of the historical user, data related to a location of the historical user, data related to employment of the historical user, data related to financial characteristics of the historical user, demographics data associated with the historical user, clickstream data associated with the historical user, data identifying a business associated with the user, data identifying a current product or service of the data management system 112 accessed by the historical user, or data related to other characteristics of the historical user.

The training set data 150 includes historical promotional message characteristics data 154. The historical promotional message characteristics data 154 identifies characteristics of the various historical promotional messages that have been presented previously to the historical users. The historical promotional message characteristics data 154 can identify, for each historical promotional message, a name of a merchant associated with the historical promotional message, a type of product associated with the promotional message, a type of service associated with the historical promotional message, text included in the historical promotional message, graphics included in the historical promotional message, a size of the historical promotional message, screen placement of the promotional message, a medium via which the promotional message is presented, or other characteristics associated with the historical promotional message.

The training set data 150 includes clickthrough data 156. The clickthrough data 156 includes, for each pairing of a historical user and a historical promotional message, a number of times that the historical user was exposed to the historical promotional message and a number of times that the user selected or clicked on the historical promotional message. The clickthrough data 156 can include a clickthrough rate corresponding to the number of times that the historical user was exposed to the historical promotional message divided by the number of times that the user selected or clicked on the historical promotional message.

The machine learning training module 122 utilizes the training set data 150 to train the predictive model 120 to generate prediction scores for pairs of users and historical promotional messages. In particular, the machine learning training module 122 utilizes the historical user characteristics data 152, the historical promotional message characteristics data 154, and the clickthrough data 156 to train the predictive model 120 to generate prediction scores predicting the probability that a given user will click on or otherwise select a given promotional message if the promotional message is presented to the user.

The training set data 150 is provided to the predictive model 120 in a variety of formats. The training set data 150 includes many different kinds of data. The type of format for a given data item from the training set data 150 is selected based on the type of the data item. A suitable format is selected based on the type of the data item.

The historical user characteristics include data items that correspond to real value features with real number values. The real numbers are mapped to an inverse cumulative distribution function (CDF) and fed into the model as real numbers during the training process. Real value features include features that have a numerical value in which the magnitude of the numerical value is meaningful in understanding the relationship between two numbers. Real valued features can include characteristics such as age and income in which the magnitude of the value of the characteristics is meaningful in understanding the value of the characteristics. As a contrary example, a Zip code is not a real value feature, in spite of having a real number value. This is because the magnitude of the Zip code values is not meaningful in understanding the relationship between two Zip code values. Real valued features are fed into the predictive model 120 after being mapped via the CDF. Other functions can be utilized to format real valued characteristics for the training set data 150.

The historical user characteristics include data items that are categorical in nature. Historical user characteristics that are categorical in nature can include marital status, gender, ZIP Code, or other types of characteristics of which each historical user will fall into one of a finite number of categories. Additionally, the historical user characteristics data can include data related to clickstream data. Categorical clickstream data can include locations within the data management application that the user has accessed. For example, each data management page that users can access can include a unique identifier. The historical user characteristics data 152 can include data indicating which pages have been accessed by a historical user, as well as on which page the various promotional messages were presented to the historical user.

Historical user characteristics that are categorical in nature or formatted based on the cardinality of the particular type of category. For example, categorical data items with low cardinality can be formatted in a first manner, while categorical data items with a high cardinality can be formatted in a second manner. A threshold number of dimensions or categories can be defined indicating a cut off between high and low categorical cardinality. In one example, the threshold defining low cardinality can include 16 or fewer possible values or dimensions. In this example, categorical data items with cardinality higher than 16 would be categorized as having high cardinality. Other thresholds or cut-offs can be selected.

Low cardinality data items from the historical user characteristics data 152 are mapped with a one-hot encoded input. In one hot encoding, each data item is represented by a number of bits corresponding to the number of possible categories for the data item. Each category is represented by one of the data values. If the data item falls in a particular category, the bit corresponding to that category receives a value of "1", while all other bits of the value of "0". This can be very helpful in machine learning processes. Examples of possible low cardinality data items include marital status, gender, a current product of the data management system 112 that the user has purchased and is accessing, or other types of data items in which the number of possible categories is relatively low, for example, less than or equal to 16. In the example of marital status, if the possible categories include only a "single" or "married", then the data item corresponding to marital status can be formatted with two bits wherein the status of single corresponds to a first bit being 1 and the second being 0, and in which the status of married corresponds to a second bit being 1 and the first bit being 0. If the marital status data item can include other values such as "previously married", then the data item can be formatted with an additional bit for each additional possible category. The historical user characteristics data items that correspond to Boolean values are mapped to a single bit having either a "0" or a "1".

High cardinality data items from the historical user characteristics data 152 are mapped with a trainable embedding vector input. High cardinality data items can include data items with more than 16 possible categories. Examples of high cardinality data items can include ZIP Code and location within the data management application. These data items are embedded as vectors in a vector embedding space. These data items can be embedded in accordance with one or more of a word2vec, sentence2vec, or other vector embedding processes in which words, numbers, or strings are embedded as vectors in a vector embedding space. Each data item with high cardinality is embedded in the vector space having a number of dimensions equal to the fourth root of the number of possible categories.

The promotional message characteristics data 148 for can be formatted in the same manner as the historical user characteristics data 152. For example, data items from the historical promotional message characteristics data 154 can be classified as real value data items, low cardinality categorical data items, high cardinality categorical data items, and Boolean value data items. The promotional message characteristics data 148 for can be formatted in the same manner as the historical user characteristics data 152, or with different types of formatting then the historical user characteristics data 152.

The historical promotional message characteristics data 154 includes, for each promotional message, data indicating text that is included in the promotional message, graphics that were included in the promotional message, audio or video effects that were included in the promotional message, a screen placement of the promotional message, whether the promotional message was presented in a mobile or desktop view, an identification of a merchant or third-party associated with the promotional message, a location within the data management application where the promotional message appeared, or other types of data associated with the promotional message.

The clickthrough data 156 includes data indicating, for each pair of a historical user and the historical promotional message, the number of times that the historical user was exposed to the promotional message, and the number of times that the user clicked on or otherwise selected the historical promotional message. The clickthrough data 156 is matched to a selected format for the machine learning process.

The clickthrough data 156 is filtered to remove pairs in which the historical user was not exposed to the historical promotional message. Thus, clickthrough rates of zero in which the historical user was not exposed to the historical promotional message, are filtered from the training set data 150.

The clickthrough data 156 includes weighting data for the clickthrough rate for a given historical user and historical promotional message pair. Clickthrough rates are weighted based on the number of times that the historical user was exposed to the historical promotional message. This can help combat the problem of data sparsity. For example, a clickthrough rate of zero in which the historical user was exposed to the historical promotional message only a single time may be less meaningful than a clickthrough rate of zero in which the historical user was exposed to the historical promotional message 20 times. Accordingly, the data management system 112 assigns a weight to the clickthrough rate for a pair based on the number of times that the historical user was exposed to the historical promotional message.

The weights for the clickthrough rates are calculated in accordance with small sample error adjustment methods. For example, the weights can be calculated based on the small sample adjusted standard error.

After the historical user characteristics data 152, historical promotional message characteristics data 154, and the clickthrough data 156 have been gathered and formatted, the machine learning training module 122 can utilize the training set data 150 to train the predictive model 120 to generate prediction scores. The training set data 150 is retrieved and saved locally on a physical or virtual machine on which the predictive model 120 will be trained. The data is then loaded into the memory associated with the machine. The machine learning training module 122 then trains the predictive model 120 by passing the training set data 150 through the predictive model 120.

The machine learning training process includes a supervised machine learning process. The clickthrough data 156 is utilized as labels for the supervised machine learning process. The machine learning training module 122 trains the predictive model 120 to reproduce, for each historical promotional message and historical user pair, the clickthrough rate for that pair from the clickthrough data 156. The machine learning training process can include training the predictive model 120 to reproduce the clickthrough rate as adjusted in accordance with the weight assigned the clickthrough rate as set forth above. When the predictive model 120 is able to generate clickthrough rates that match or reproduce the clickthrough rates from the clickthrough data 156 within a selected accuracy, the machine learning training process is complete.

The machine learning training module 122 trains the predictive model 120 in accordance with a stochastic gradient descent process. The stochastic gradient descent process can include an iterative process for optimizing a differentiable objective function for computing prediction scores. The differentiable objective function includes a stochastic approximation of gradient descent optimization. The differentiable objective function is optimized in iterations in which the training set data 150 is passed through the predictive model 120. The samples, i.e. the pairs of historical users and historical promotional messages are selected randomly or shuffled from the order in which they appear in the training set data 150.

After the predictive model 120 has been trained, the data management system 112 utilizes the predictive model 120 to generate, for each current user of the data management system 112, prediction score data 164. The prediction score data 164 for a given current user includes, for each current promotional message from the promotional messaging content database 118, a respective prediction score. The prediction score is an indication of how likely it is that the current user would click on or otherwise select the current promotional message if the user is exposed to the current promotional message.

The prediction score data 164 is generated, for a given user and current promotional message pair, by passing current user characteristics data 160 associated with the current user, and the current promotional message characteristics data 162 associated with the current promotional message, through the predictive model 120. The predictive model 120 processes the current user characteristics data 160 and the current promotional message characteristics data 162 and generates a prediction score, represented by prediction score data 164, indicating how likely the user is to click on the current promotional message.

The current user characteristics data 160 includes, for each current user, data indicating characteristics of the current user. The current user characteristics data 160 can include the same types of data included in the historical user characteristics data 152. The current user characteristics data 160 is formatted in the same manner as the historical user characteristics data 152 was formatted for the machine learning process.

The current promotional message characteristics data 162 includes the same type of data as the historical promotional message characteristics data 154. Furthermore, the current promotional message characteristics data 162 includes the same data as the historical promotional message characteristics data 154 for promotional messages that were used in the machine learning process and which remain in the pool of possible promotional messages that may be presented to current users. Additionally, for new promotional messages that were not included in the training set data, the current promotional message characteristics data 162 includes the same types of data as the historical promotional message characteristics data 154, formatted in the same way.

The predictive model 120 is able to generate prediction scores for both new users and new promotional messages. The machine learning training module 122 utilizes the training set data 150 to train the predictive model 120 based on user features and message features. The result is that the predictive model 120 can generate prediction scores for new users and new messages based on the features or characteristics of the new users and new messages.

The data management system 112 utilizes the prediction score database 124 to store prediction scores for the various current users and currently available promotional messages. For example, the prediction score database 124 can include prediction score table data 166. The prediction score table data 166 includes a prediction score table. The prediction score table includes, for each current user, a respective prediction score for each available promotional message. The prediction score table can include prediction scores for each current user of the data management system 112. Alternatively, the prediction score table data 166 can include a separate prediction score table for each current user alternatively, the prediction score table data can include several tables, each table including prediction scores for a certain number of current users of the data management system 112.

The predictive model 120 generates prediction score table data 166 periodically. In other words, the current user characteristics data 160 and the current promotional message characteristics data 162 are periodically passed through the predictive model 120 to generate prediction score data 164. The prediction score data 164 is utilized to update the prediction score table data 166. Thus, as new promotional messages are introduced, as current user characteristics data 160 is updated related to current users, and as new current users sign up for the data management system 112, the data management system 112 updates the prediction score table data 166.

The data management system 112 generates the prediction score data 164 for all current users every night. Thus, in the night hours when the load on the data management system 112 is lowest, the data management system 112 passes the current user characteristics data 160 and current promotional message characteristics data 162, for all current users and currently available promotional messages, through the predictive model 120. The predictive model 120 generates updated prediction score data 164 which is used to update the prediction score table data 166.

The data management system 112 runs the predictive model 120 with a selected periodicity. The selected periodicity can include a selected number of months, weeks, days, hours, or minutes. The data management system 112 periodically runs the predictive model 120 to update the prediction score table data 166 in accordance with the selected periodicity.

When a current user of the data management system 112 accesses the data management system 112, the data management system 112 selects one or more promotional messages to be presented to the current user by referencing the prediction score table data 166. The data management system 112 references the prediction score table data 166 for the current user and identifies the promotional message or messages with the highest prediction score. The data management system 112 selects the promotional message or promotional messages with the highest prediction score for presentation to the user. The user interface module 114 presents, with the data management content data 140, the personalized promotional messaging data 144 to the current user. The personalized promotional messaging data 144 includes the one or more promotional messages selected by the data management system 112.

The data management system 112 selects, for each current user, promotional messages to be presented to the current users before the users have logged into the data management system 112. Thus, after the predictive model 120 has updated the prediction score table data 166 with new prediction score data 164, the data management system 112 automatically selects a promotional message with the highest prediction score for each current user. When a current user logs into the data management system 112, the selected promotional message is automatically presented to the current user. This alleviates the need for the data management system 112 to make real time decisions and analysis regarding what promotional message should be presented to the user because the selection has already been made based on prediction score table data 166.

The predictive model 120 can include a neural network. The neural network includes one or more hidden layers with selected numbers of neurons. The neurons are trained during the machine learning process. In use, the current user characteristics data 160 and the current promotional message characteristics data 162 are passed through the various hidden layers. The neural network then outputs prediction score data 164 from the final hidden layer.

As used herein, the terms "promotional message" and "promotional messaging" includes, but is not limited to messages or advertisements promoting a product or service of the data management system 112 or of a third party. The promoted product or service may or may not be a service for which the user must pay money. The data management system 112 may also provide messaging other than promotional messaging, such messaging that notifies the user of assistance articles, instructions, or other details about functions of the data management system or details about information requested by the data management system.

Embodiments of the present disclosure address some of the shortcomings associated with traditional data management systems that do not provide personalized messaging content to users of the data management systems. A data management system in accordance with one or more embodiments provides dynamically personalized messaging content to users of the data management system by utilizing machine learning processes to train a predictive model to quickly, efficiently, and accurately determine which promotional messages are most likely to be selected by the users. The data management system provides promotional messages based on the characteristics of the users and the characteristics of the promotional messages.

Figure 2:
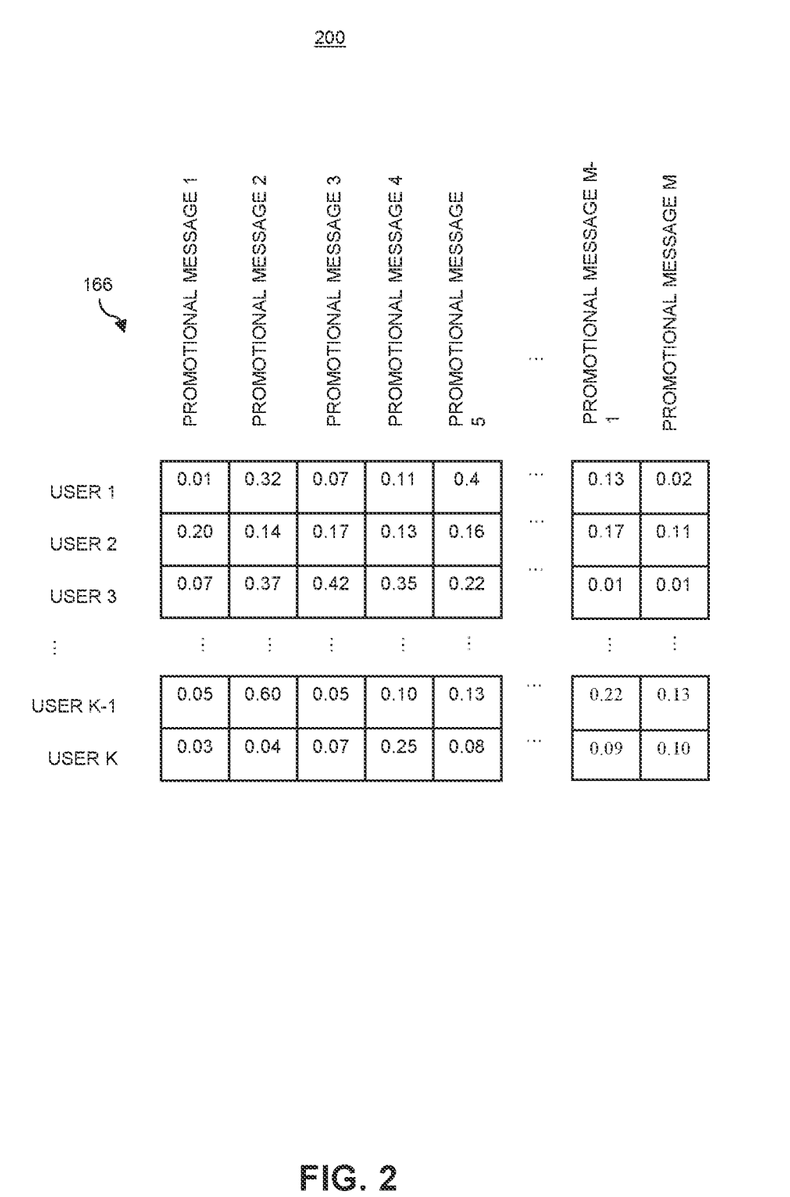
FIG. 2 is a representation of a prediction score table.

FIG. 2 is a representation 200 of a prediction score table data 166. The prediction score table data 166 includes for each of K users, a respective prediction score for each of M promotional messages. Each prediction score includes a value between 0 and 1. The higher the prediction score, the greater the probability that the user would choose to select or click on that promotional message if the promotional message is presented to the user.

The data management system 112 selects, for each of the K users, the promotional message with the highest probability score. The next time the user logs into the data management system 112, the data management system 112 presents personalized promotional messaging data 144 including the promotional message with the highest prediction score. Accordingly, for user 1, the personalized promotional messaging data 144 would include promotional message 5, which has a prediction score of 0.40. For user 2, the personalized promotional messaging data 144 would include promotional message 1, which has a prediction score of 0.20. For user three, the personalized promotional messaging data 144 will include message three, which has a prediction score of 0.42. For user K-1, the personalized promotional messaging data 144 would include promotional message 2, which has a prediction score of 0.60. For user K, the personalized promotional messaging data 144 would include the message 4, which has a prediction score of 0.25.

Figure 3:
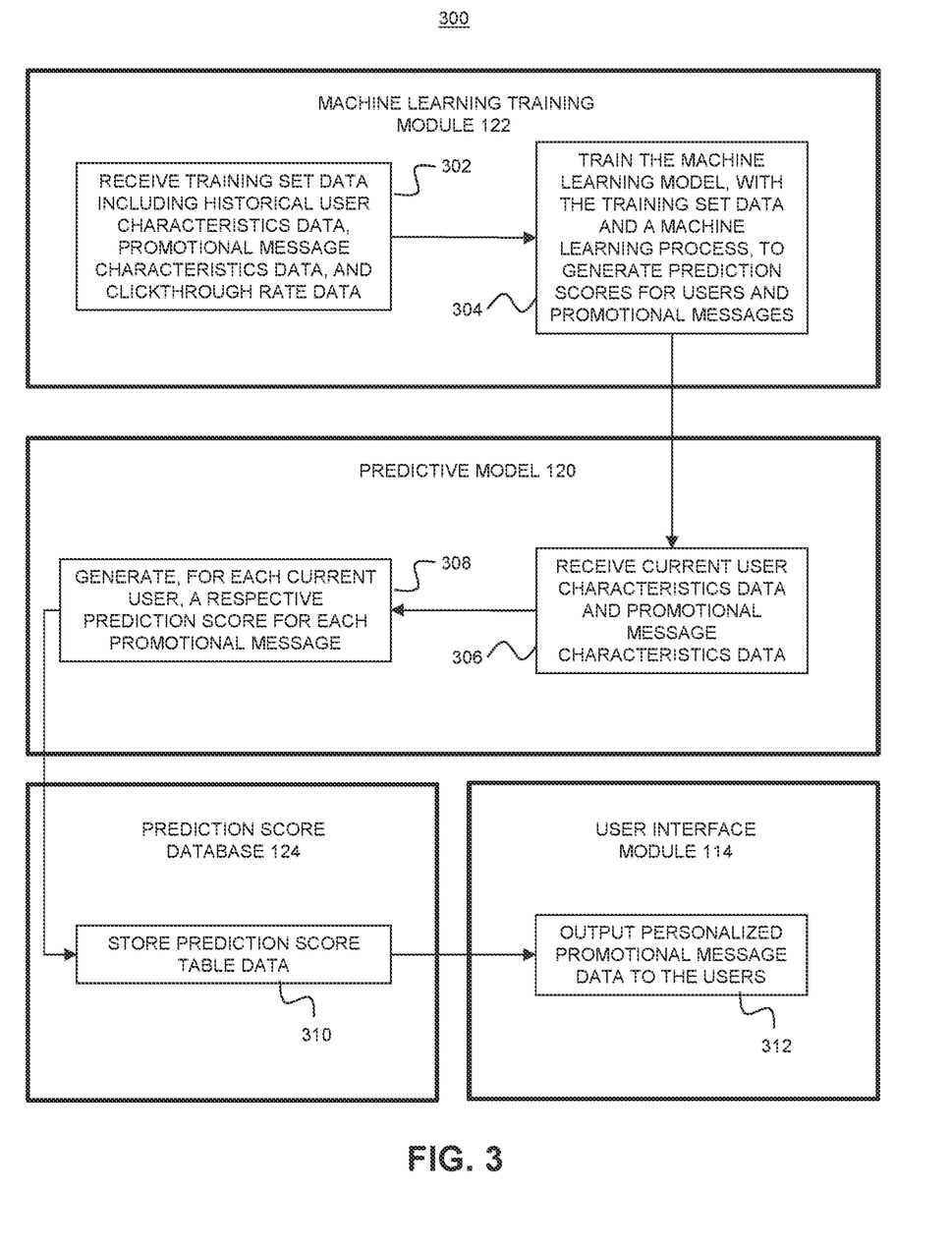
FIG. 3 is a block diagram of a process for providing personalized promotional messaging to users of a data management system, in accordance with one embodiment.

FIG. 3 illustrates a functional flow diagram of a process 300 for providing personalized promotional messaging to users of a data management system, in accordance with one embodiment.

Referring to FIGS. 1-3, and the descriptions of FIGS. 1-2 above, at block 302, a machine learning training module receives the training set data including historical user characteristics data, promotional message characteristics data, and clickthrough data, using any of the methods, processes, and procedures discussed above with respect to FIGS. 1 and 2. From block 302, process flow proceeds to block 304.

At block 304, the machine learning training module 122 trains the machine learning model, with the training set data and the machine learning process, to generate prediction scores for users and promotional messages, using any of the methods, processes, and procedures discussed above with respect to FIGS. 1 and 2. From block 304, process flow proceeds to block 306.

At block 306, a predictive model 120 receives current user characteristics data and promotional message characteristics data, using any of the methods, processes, and procedures discussed above with respect to FIGS. 1 and 2. From block 306, process flow proceeds to block 308.

At block 308, a predictive model 120 generates, for each current user, a respective prediction score for each promotional message, using any of the methods, processes, and procedures discussed above with respect to FIGS. 1 and 2. From block 308, process flow proceeds to block 310.

At block 310, a prediction score database 124 stores prediction score table data, using any of the methods, processes, and procedures discussed above with respect to FIGS. 1 and 2. From block 310, process flow proceeds to block 312.

At block 312, a user interface module 114 outputs personalized promotional message data to the users, using any of the methods, processes, and procedures discussed above with respect to FIGS. 1 and 2.

Although a particular sequence is described herein for the execution of the process 300, other sequences can also be implemented, including fewer steps or more steps.

Figure 4:
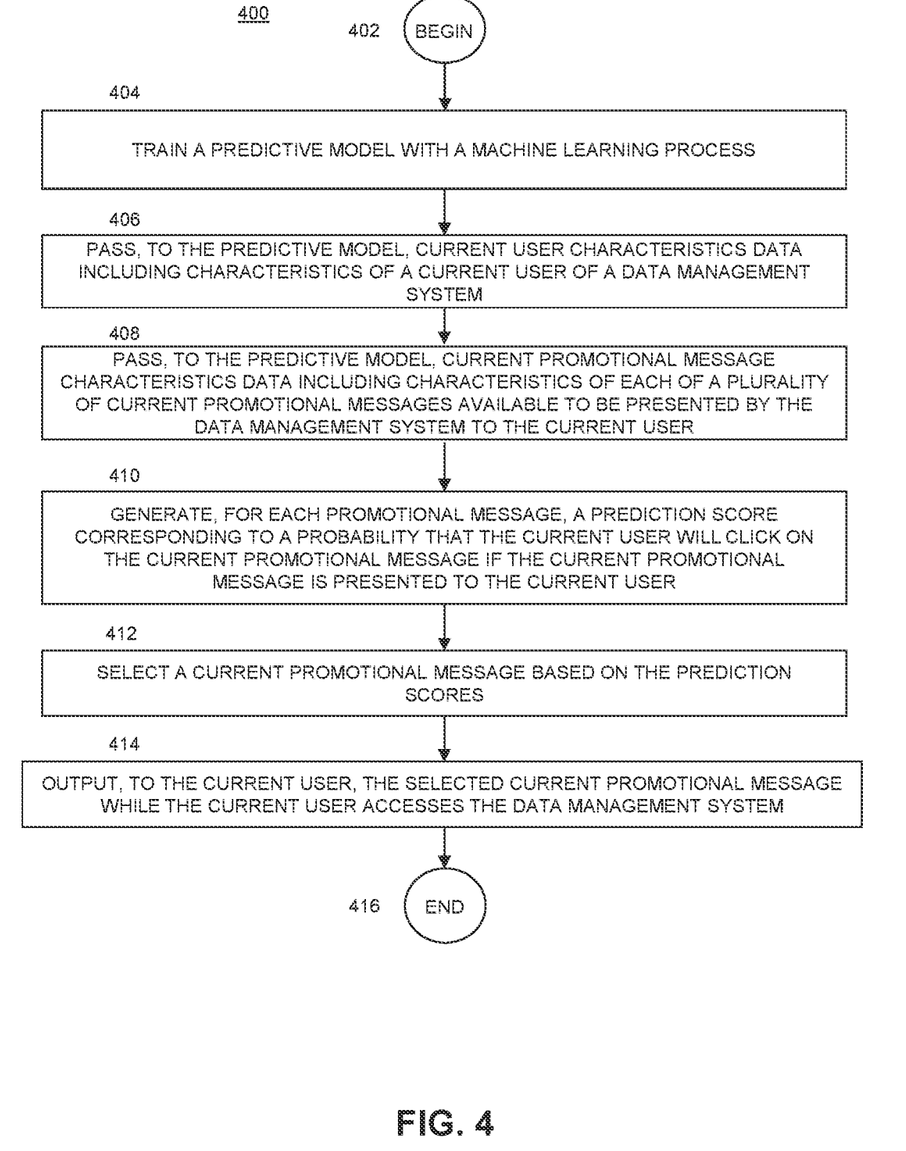
FIG. 4 is a flow diagram of a process for providing personalized promotional messaging to users of a data management system, in accordance with one embodiment.

FIG. 4 illustrates a flow diagram of a process 400 for providing personalized promotional messaging to users of a data management system.

Referring to FIG. 4, FIGS. 1 and 2, and the description of FIGS. 1 and 2 above, in one embodiment, process 400 begins at 402. From 402 process flow proceeds to 404.

At 404 a predictive model is trained with a machine learning process, using any of the methods, processes, and procedures discussed above with respect to FIGS. 1 and 2. From 404 process flow proceeds to 406.

At 406 current user characteristics data including characteristics of a current user of a data management system is passed to the predictive model, using any of the methods, processes, and procedures discussed above with respect to FIGS. 1 and 2. From 406 process flow proceeds to 408.

At 408 current promotional message characteristics data including characteristics of each of a plurality of current promotional messages available to be presented by the data management system to the current user is passed to the predictive model, using any of the methods, processes, and procedures discussed above with respect to FIGS. 1 and 2. From 408 process flow proceeds to 410.

At 410 a prediction score is generated, for each promotional message, corresponding to a probability that the current user will click on the current promotional message if the current promotional message is presented to the current user, using any of the methods, processes, and procedures discussed above with respect to FIGS. 1 and 2. From 410 process flow proceeds to 412.

At 412 a current promotional message is selected based on the prediction scores, using any of the methods, processes, and procedures discussed above with respect to FIGS. 1 and 2. From 412 process flow proceeds to 414.

At 414 the selected current promotional message is output to the current user while the current user accesses the data management system, using any of the methods, processes, and procedures discussed above with respect to FIGS. 1 and 2. From 414 process flow proceeds to 416.

At 416 the process 400 for providing personalized promotional messaging to users of a data management system is exited to await new data and/or instructions.

Figure 5:
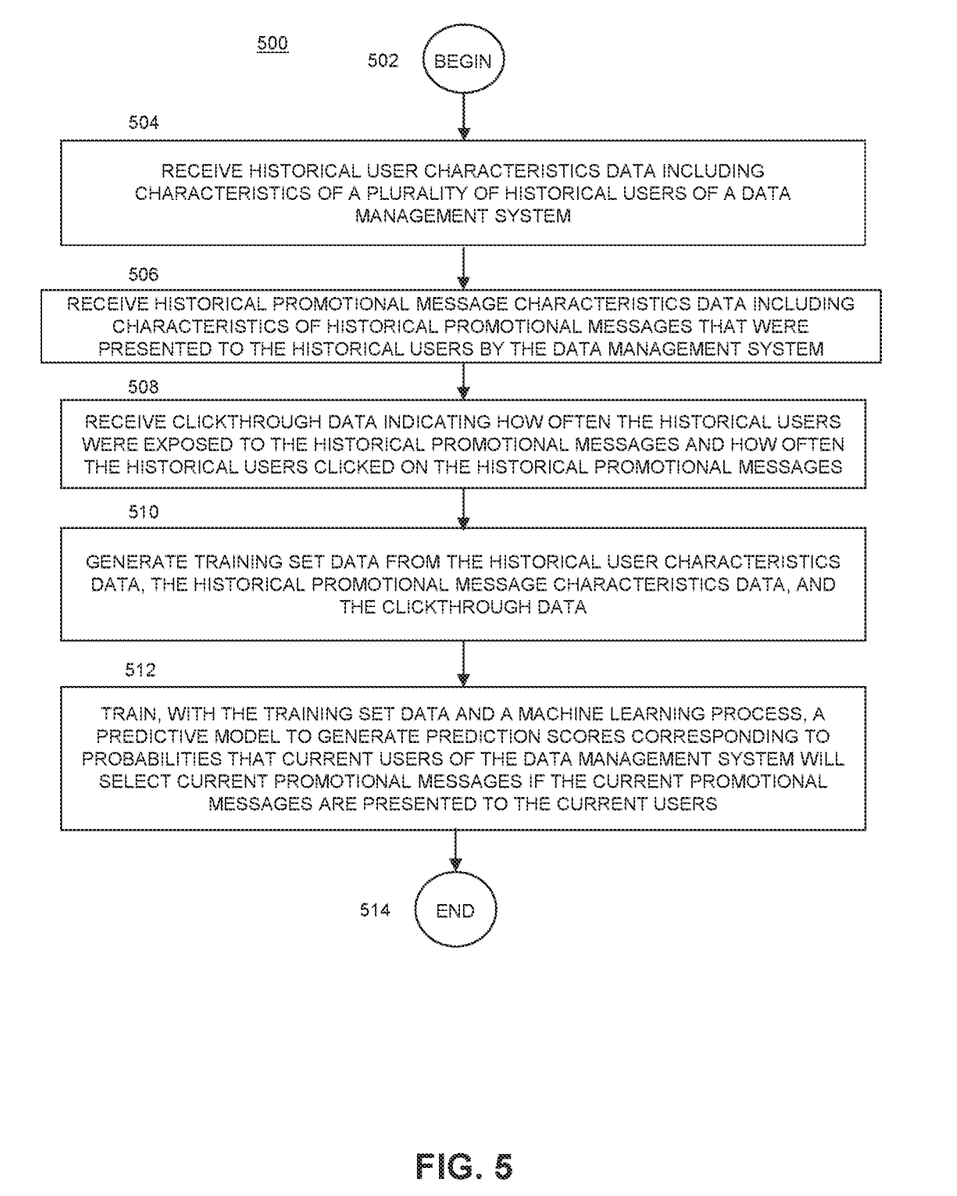
FIG. 5 is a flow diagram of a process for providing personalized promotional messaging to users of a data management system, in accordance with one embodiment.

FIG. 5 illustrates a flow diagram of a process 500 for providing personalized promotional messaging to users of a data management system.

Referring to FIG. 5, FIGS. 1 and 2, and the description of FIGS. 1 and 2 above, in one embodiment, process 500 begins at 502 and process flow proceeds to 504. At 504 historical user characteristics data is received including characteristics of a plurality of historical users of a data management system, using any of the methods, processes, and procedures discussed above with respect to FIGS. 1 and 2. From 504 process flow proceeds to 506.

At 506 historical promotional message characteristics data is received including characteristics of historical promotional messages that were presented to the historical users by the data management system, using any of the methods, processes, and procedures discussed above with respect to FIGS. 1 and 2. From 506 process flow proceeds to 508.

At 508 clickthrough data is received indicating how often the historical users were exposed to the historical promotional messages and how often the historical users clicked on the historical promotional messages, using any of the methods, processes, and procedures discussed above with respect to FIGS. 1 and 2. From 508 process flow proceeds to 510.

At 510 training set data is generated from the historical user characteristics data, the historical promotional message characteristics data, and the clickthrough data, using any of the methods, processes, and procedures discussed above with respect to FIGS. 1 and 2. From 510 process flow proceeds to 512.

At 512 a predictive model is trained, with the training set data and a machine learning process, to generate prediction scores corresponding to probabilities that current users of the data management system will select current promotional messages if the current promotional messages are presented to the current users, using any of the methods, processes, and procedures discussed above with respect to FIGS. 1 and 2. From 512 process flow proceeds to 514.

At 514 the process 500 for providing personalized promotional messaging to users of a data management system is exited to await new data and/or instructions.

As noted above, the specific illustrative examples discussed above are but illustrative examples of implementations of embodiments of the method or process for providing a tax refund confidence indicator to a user. Those of skill in the art will readily recognize that other implementations and embodiments are possible. Therefore, the discussion above should not be construed as a limitation on the claims provided below.

A computing system implemented method for providing personalized promotional messaging to users of a data management system includes receiving historical user characteristics data including characteristics of a plurality of historical users of a data management system and receiving promotional message characteristics data including characteristics of historical promotional messages that were presented to the historical users by the data management system. The method includes receiving clickthrough data indicating how often the historical users were exposed to the historical promotional messages and how often the historical users clicked on the historical promotional messages and generating training set data from the historical user characteristics data, the historical promotional message characteristics data, and the clickthrough data. The method includes training, with the training set data and a machine learning process, a predictive model to generate prediction scores corresponding to probabilities that current users of the data management system will select current promotional messages if the current promotional messages are presented to the current user.

A system for providing personalized promotional messaging to users of a data management system includes at least one processor and at least one memory coupled to the at least one processor. The at least one memory has stored therein instructions which, when executed by any set of the one or more processors provides a data management system that performs a process including receiving historical user characteristics data including characteristics of a plurality of historical users of a data management system and receiving promotional message characteristics data including characteristics of historical promotional messages that were presented to the historical users by the data management system. The process includes receiving clickthrough data indicating how often the historical users were exposed to the historical promotional messages and how often the historical users clicked on the historical promotional messages and generating training set data from the historical user characteristics data, the historical promotional message characteristics data, and the clickthrough data. The process includes training, with the training set data and a machine learning process, a predictive model to generate prediction scores corresponding to probabilities that current users of the data management system will select current promotional messages if the current promotional messages are presented to the current user.

A computing system implemented method for providing personalized promotional messaging to users of a data management system includes training a predictive model with a machine learning process, passing, to the predictive model, current user characteristics data including characteristics of a current user of a data management system, and passing, to the predictive model, current promotional message characteristics data including characteristics of each of a plurality of current promotional messages available to be presented by the data management system to the current user. The method includes generating, for each promotional message, a prediction score corresponding to a probability that the current user will click on the current promotional message if the current promotional message is presented to the current user, selecting a current promotional message based on the prediction scores, and outputting the selected current promotional message to the current user while the current user accesses the data management system.

A system for providing personalized promotional messaging to users of a data management system includes at least one processor and at least one memory coupled to the at least one processor. The at least one memory has stored therein instructions which, when executed by any set of the one or more processors provides a data management system that performs a process including training a predictive model with a machine learning process, passing, to the predictive model, current user characteristics data including characteristics of a current user of a data management system, and passing, to the predictive model, current promotional message characteristics data including characteristics of each of a plurality of current promotional messages available to be presented by the data management system to the current user. The process includes generating, for each promotional message, a prediction score corresponding to a probability that the current user will click on the current promotional message if the current promotional message is presented to the current user, selecting a current promotional message based on the prediction scores, and outputting the selected current promotional message to the current user while the current user accesses the data management system.

A computing system implemented method for providing personalized promotional messaging to users of a data management system includes passing, to the predictive model, current user characteristics data including characteristics of each of a plurality of current users of a data management system and passing, to the predictive model, current promotional message characteristics data including characteristics of each of a plurality of current promotional messages available to be presented by the data management system to the current users of the data management system. The method includes generating, for each current user, a plurality of prediction scores including a respective prediction score for each current promotional message, each prediction scores corresponding to a probability that the current user will click on the current promotional message if the current promotional message is presented to the current user and generating a prediction score table including, for each current user, the prediction scores for each current promotional message.

A system for providing personalized promotional messaging to users of a data management system includes at least one processor and at least one memory coupled to the at least one processor. The at least one memory has stored therein instructions which, when executed by any set of the one or more processors provides a data management system that performs a process including passing, to the predictive model, current user characteristics data including characteristics of each of a plurality of current users of a data management system and passing, to the predictive model, current promotional message characteristics data including characteristics of each of a plurality of current promotional messages available to be presented by the data management system to the current users of the data management system. The process includes generating, for each current user, a plurality of prediction scores including a respective prediction score for each current promotional message, each prediction scores corresponding to a probability that the current user will click on the current promotional message if the current promotional message is presented to the current user and generating a prediction score table including, for each current user, the prediction scores for each current promotional message.

Embodiments of the present disclosure address some of the shortcomings associated with traditional data management systems that provide static and inadequate promotional messaging to users. A data management system in accordance with one or more embodiments provides dynamic personalized messaging. The various embodiments of the disclosure can be implemented to improve the technical fields of data processing, data transmission, data analysis, promotional messaging, and data collection. Therefore, the various described embodiments of the disclosure and their associated benefits amount to significantly more than an abstract idea.

Using the disclosed embodiments of a method and system for providing personalized promotional messaging to users of a data management system, a method and system for providing personalized promotional messaging to users of a data management system is provided. Therefore, the disclosed embodiments provide a technical solution to the long-standing technical problem of static, inefficient, and ineffective messaging in self-help systems.

In addition, the disclosed embodiments of a method and system for providing personalized promotional messaging to users of a data management system are also capable of dynamically adapting to constantly changing fields such as tax return preparation and other kinds of financial management. Consequently, the disclosed embodiments of a method and system for providing personalized promotional messaging to users of a data management system also provide a technical solution to the long-standing technical problem of static and inflexible data management systems.

The result is a much more accurate, adaptable, and robust method and system for providing personalized promotional messaging to users of a data management system. This, in turn, results in: less human and processor resources being dedicated to providing personalized messaging content to users because more accurate and efficient analysis methods can be implemented, i.e., usage of fewer processing resources, usage of fewer memory storage assets, and less communication bandwidth being utilized to transmit data for analysis and consumption.

The disclosed method and system for providing personalized promotional messaging to users of a data management system does not encompass, embody, or preclude other forms of innovation in the area of electronic data management systems. In addition, the disclosed method and system for providing personalized promotional messaging to users of a data management system is not related to any fundamental economic practice, fundamental data processing practice, mental steps, or pen and paper-based solutions, and is, in fact, directed to providing solutions to new and existing problems associated with electronic data management systems. Consequently, the disclosed method and system for providing personalized promotional messaging to users of a data management system, does not encompass, and is not merely, an abstract idea or concept.

Therefore, numerous variations, whether explicitly provided for by the specification or implied by the specification or not, may be implemented by one of skill in the art in view of this disclosure.

What is claimed is:

1. A method for identifying a promotional message most likely to be selected by a system user, the method performed by one or more processors of a system and comprising:
    retrieving user data associated with a plurality of system users;
    retrieving message data associated with a plurality of promotional messages;
    generating user-message pairs each associated with a clickthrough rate for one of the plurality of system users with respect to one of the plurality of promotional messages;
    filtering out ones of the user-message pairs associated with a clickthrough rate of zero;
    formatting the user data and the message data into one or more selected formats;
    feeding the formatted user data, formatted message data, and remaining user-message pairs to a predictive model;
    iteratively training the predictive model, using a machine learning process, to generate a probability score indicating a likelihood that a given system user would select a given promotional message if presented to the given system user based on the formatted user data, formatted message data, and remaining user-message pairs;
    providing user data associated with a new system user to the trained predictive model;
    generating, using the trained predictive model, for each respective promotional message of the plurality of promotional messages, a probability score indicating a likelihood that the new system user will select the respective promotional message if presented to the new system user; and
    identifying which of the plurality of promotional messages is most likely to be selected by the new system user based on the generated probability scores.

2. The method of claim 1, wherein the user data indicates at least one of demographic characteristics, financial characteristics, or clickstream characteristics for the plurality of system users.

3. The method of claim 1, wherein the message data indicates at least one of a merchant, an image, an animation, a video, text, or audio associated with the plurality of promotional messages.

4. The method of claim 1, wherein the formatting includes:
    formatting the user data in a first format; and
    formatting the message data in a second format different than the first format.

5. The method of claim 1, further comprising:
    training the predictive model using the machine-learning process to generate user-message pairings having clickthrough rates within a selected accuracy.

6. The method of claim 1, further comprising:
    generating one or more prediction score tables each indicating at least some of the generated probability scores.

7. The method of claim 6, wherein each of the generated probability scores has a value between 0 and 1.

8. The method of claim 6, further comprising:
    selecting, for each respective user of a number of system users not logged into the system, a relevant promotional message based on the one or more prediction score tables.

9. The method of claim 8, further comprising:
determining that a first user of the number of system users has logged into the system; and
presenting the first user with the first user's corresponding relevant promotional message.

10. A system comprising:
one or more processors; and
a memory coupled to the one or more processors and storing instructions that, when executed by the one or more processors, cause the system to perform operations including:
retrieving user data associated with a plurality of system users;
retrieving message data associated with a plurality of promotional messages;
generating user-message pairs each associated with a clickthrough rate for one of the plurality of system users with respect to one of the plurality of promotional messages;
filtering out ones of the user-message pairs associated with a clickthrough rate of zero;
formatting the user data and the message data into one or more selected formats;
feeding the formatted user data, formatted message data, and remaining user-message pairs to a predictive model;
iteratively training the predictive model, using a machine learning process, to generate a probability score indicating a likelihood that a given system user would select a given promotional message if presented to the given system user based on the remaining user-message pairs, the formatted user data, and the formatted message data;
providing user data associated with a new system user to the trained predictive model;
generating, using the trained predictive model, for each respective promotional message of the plurality of promotional messages, a probability score indicating a likelihood that the new system user will select the respective promotional message if presented to the new system user; and
identifying which of the plurality of promotional messages is most likely to be selected by the new system user based on the generated probability scores.

11. The system of claim 10, wherein the user data indicates at least one of demographic characteristics, financial characteristics, or clickstream characteristics for the plurality of system users.

12. The system of claim 10, wherein the message data indicates at least one of a merchant, an image, an animation, a video, text, or audio associated with the plurality of promotional messages.

13. The system of claim 10, wherein the formatting includes:
formatting the user data in a first format; and
formatting the message data in a second format different than the first format.

14. The system of claim 10, wherein execution of the instructions causes the system to perform operations further including:
training the predictive model using the machine-learning process to generate user-message pairings having clickthrough rates within a selected accuracy.

15. The system of claim 10, wherein execution of the instructions causes the system to perform operations further including:
generating one or more prediction score tables each indicating at least some of the generated probability scores.

16. The system of claim 15, wherein each of the generated probability scores has a value between 0 and 1.

17. The system of claim 15, wherein execution of the instructions causes the system to perform operations further including:
selecting, for each respective user of a number of system users not logged into the system, a relevant promotional message based on the one or more prediction score tables.

18. The system of claim 17, wherein execution of the instructions causes the system to perform operations further including:
determining that a first user of the number of system users has logged into the system; and
presenting the first user with the first user's corresponding relevant promotional message.

* * * * *